H. P. C. BROWNE.
ODOMETER.
APPLICATION FILED JAN. 29, 1913.

1,157,365.

Patented Oct. 19, 1915.

Witnesses:
Edward Rowland
Katharine C. Mead

Harry P. C. Browne
Inventor
By his Attorneys
Wilkinson, Witherspoon and MacKaye

UNITED STATES PATENT OFFICE.

HARRY P. C. BROWNE, OF BROOKLYN, NEW YORK.

ODOMETER.

1,157,365.  Specification of Letters Patent.  Patented Oct. 19, 1915.

Application filed January 29, 1913. Serial No. 745,008.

*To all whom it may concern:*

Be it known that I, HARRY P. C. BROWNE, a citizen of the United States, residing at Brooklyn, in the State of New York, have invented certain new and useful Improvements in Odometers; and I do hereby declare the following to be a full, clear, and exact description of the invention, such as will enable others skilled in the art to which it appertains to make and use the same.

My present invention relates to certain improvements in that form of odometer, or automatic means for counting the revolutions of a vehicle wheel wherein the indicator is placed at the end of the wheel axle, as, for instance, in the form of odometer shown in my Letters Patent No. 942,883, granted December 14th, 1909.

One object of my invention is the provision of a simple and easily applied construction presenting features of extra solidity and strength; the same being particularly calculated to protect the mechanism of the odometer proper from accidental blows.

A further object of the invention is to provide a novel means for transmitting the movements of the vehicle wheel to the counting mechanism, whereby a positive and gradual action is secured, and the counter is made to record movement of the vehicle in either direction.

My improvement is shown in a preferred form in the accompanying drawings, wherein—

Figure 1:
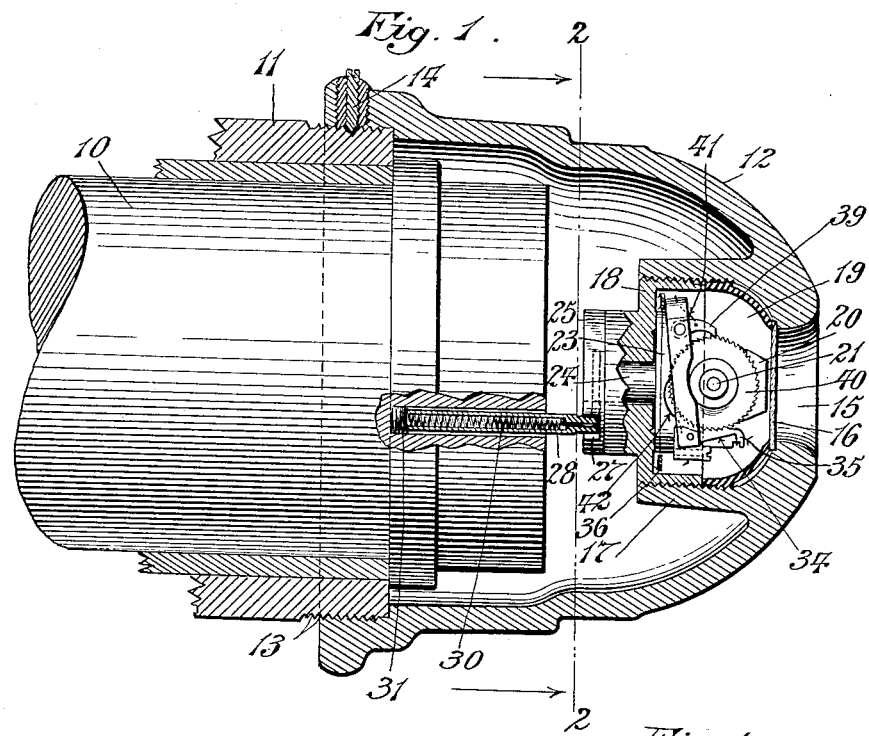
Figure 2:
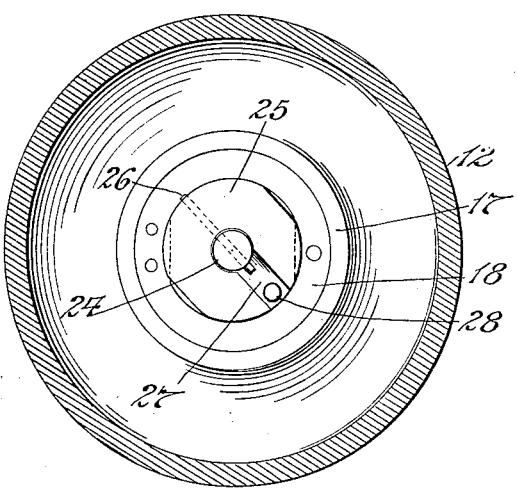
Figure 4:
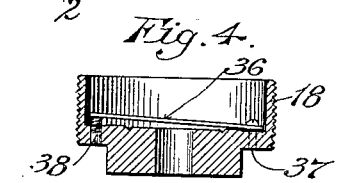
Figure 3:
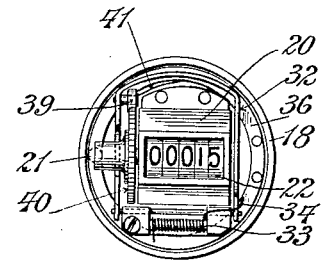

Figure 1 is a vertical section of the device in place, Fig. 2 is a cross section of the same on the line 2—2 of Fig. 1, Fig. 3 is a face view of the counter in its socket, and Fig. 4 is a transverse section of the socket and ring viewed at right angles to the position as seen in Fig. 1.

The fixed axle of the vehicle is shown at 10 and the hub of the wheel at 11. Upon the end of the hub is fixed the odometer carrier which, in my improvement, takes the form of a dome-shaped shell 12, whose outer curved surface is adapted to receive only a glancing blow in case of collision, and by diverting such blow to greatly decrease the danger of injury to the mechanism.

The carrier 12 may be fixed upon the hub 11 of the wheel in any desired manner, but I prefer to accomplish this by means of the thread 13 and to insure prevention of unscrewing of the carrier by the use of a cotter pin 14.

The outer end of the carrier 12 has an opening 15 preferably closed by glass or equivalent transparent substance 16, behind which is the chamber carrying the odometer proper, which chamber is formed by a substantially cylindrical or ring shaped inward projection 17 preferably integral with the carrier 12. The ring is closed on the inner side by a socket 18 which screws into said ring and abuts against an internal shell 19 which, with the outer dome-shaped member serves to hold the glass 16 in place.

The odometer proper comprises the usual casing 20 carrying any well known form of counting mechanism operated in any well known manner by revolution of the shaft 21 so as to register the mileage by means of numerals opposite the opening 22 in the casing 20 as shown in Fig. 3. The casing is carried upon a substantially cylindrical base 23 which is provided with a shaft 24 passing through a suitable central opening in the socket 18, the outer end of which shaft is fixed to a revoluble plate 25, which lies flat against the inner face of the socket 18. The shaft 24 and plate 25 are preferably connected by a removable pin 26 as shown in Fig. 2, and the plate 25 is provided with a recess 27 which receives the end of a pin 28 projecting eccentrically from the end of the fixed hub 10. This pin is adapted to slide within the socket which holds it, and is provided with means tending to push it outward so that its tip bears constantly against the socket 18. This has a double advantage. It prevents disengagement of the pin from the recess 27 in case of lateral movements of the vehicle wheel; and, when the parts are assembled the pin 28 can be relied upon to drop automatically into said recess upon turning the socket 18 either way until the recess comes under the pin. Various means for causing this action of the pin are within my invention, and the preferred form shown is described as follows: The pin 28 has a single bore which receives a spring 30, the tip of which is secured to the tip of the pin 28 as shown in Fig. 1. The rear end of the spring 30 is enlarged as shown at 31 and the whole device is pushed into a suitable recess in the end of the axle 10 into which the enlarged portion 31 of the spring fits tightly. The effect of this construction is that after the pin has been pushed into the recess in the axle 10, the swelling of the enlarged portion 31 of the spring holds the pin tightly in place. Other expanding means at the inner end of the spring may be used without departing from my invention.

The spring 30 acts to constantly press the sliding pin 28 outward, thus insuring the automatic coupling above described, as well as preventing uncoupling in case of outward movement sidewise of the vehicle wheel.

Upon the base 23 which carries the casing 20 is mounted a bail or frame 32 pivoted in the block 33ª, by means of the shaft 33; the said shaft being fixed to the bail, but free to turn in the block 33ª. The bail 32 is provided with a spring 34 acting upon a shoulder 35 on the bail 32, whereby the end of the bail is pressed downward against a ring 36 in the bottom of the socket 18. This ring is fixed to the bottom of the socket by rivets 37 or otherwise and at its opposite diameter it is lifted by means of a pin 38 so as to take an inclined position as clearly shown in Fig. 4. Upon one side of the bail 32 there is pivoted a pawl 39 which engages fine teeth upon a ratchet wheel 40 fixed upon a shaft 21. The pawl 39 is held in engagement with the teeth on the wheel 40 by means of a spring 41 and a suitable spring or similar pawl 42 serves to prevent backward movement of the wheel 40.

It will be seen from the construction described that if the socket 18 and the base 23 be revolved, around their common center, one with relation to the other, the outer end of the bail 32 will move over the ring 36 which is fixed to the socket 18 and, owing to the inclined position of said ring, the bail will be moved up and down. This will cause the pawl 39 to turn the wheel 40 on each upward movement, the wheel being held motionless on each downward movement. This construction affords a perfectly smooth and gradual transmitting means whereby operation of the odometer proper is accomplished, whether the vehicle wheel be moved in one direction or the other.

It will be clear from the above description that the necessary relative rotary movement between the socket 18 and the base 23 results from the fact that the socket rotates with the holder 12, fixed to the wheel, while the rotation of the base 23 and the odometer proper is prevented by the pin 28 fixed to the stationary axle 10. I prefer that the recess 27 should take the form of a substantially radial slot in the disk or plate 25, which slot has a direction substantially forty-five degrees from the horizontal. This gives the best location for the pin 28 in the end of the axle.

Various changes may be made in my improved arrangement without departing from the scope of my invention, and I do not limit myself to the details herein shown and described.

What I claim is—

1. In a device of the class described adapted for attachment to a vehicle wheel, a socket fixed to the vehicle wheel, a base mounted thereon having a shaft passing centrally through said socket, a counter mechanism on said base, a removable disk on said shaft behind said socket having a radial slot, making an angle of substantially forty-five degrees with the horizontal, and a pin fixed to the vehicle axle and extending into said slot; substantially as described.

2. In a device of the class described and in combination with a wheel and a fixed axle, having a recess, a pin having a central bore placed in said recess, a spring attached within said bore having an enlarged portion outside of said bore adapted to be tightly seated within said recess, and means fixed to said wheel and coöperating with said pin for automatically counting the number of revolutions of said wheel, substantially as described.

3. In a device of the class described and in combination with a wheel and a fixed axle, having a recess, a sliding pin within said recess, means tending to press said pin outward, and means adapted to move with said wheel and coupling with said pin for automatically counting the number of revolutions of said wheel, substantially as described.

4. In a hub-odometer, a counting device comprising a registering train, including counting wheels, a ratchet wheel driving said wheels, and a shaft mounting said ratchet and connecting same to said wheels; supporting means for said registering train, including a socket, a wall at the end of said socket, a spindle in said socket, a concentric disk at the end of said spindle, and means for affixing said train to said disk; operating means including a yoke spanning said train and said ratchet and arranged to rock back and forward with a second shaft parallel to said first named shaft and affixed at each end to the extremities of said yoke, a block for journaling said second named shaft, a pawl carried by said yoke for engaging said ratchet, a detent pawl mounted upon said block for engaging said ratchet, springs for actuating said pawls, a shaft in said block, and a helical spring encircling same and commanding the backward motion of said yoke; and actuating means, carried by the wall of said supporting means for commanding the forward motion of said yoke, the said actuating means comprising a plane ring concentrically disposed around said disk and spindle, means for affixing said ring to said wall at substantially the end of a given diameter, and adjustable means for elevating the free side of said ring from the wall of said supporting means.

In testimony whereof, I affix my signature, in presence of two witnesses.

HARRY P. C. BROWNE.

Witnesses:
   H. S. MACKAYE,
   KATHARINE C. MEAD.

Copies of this patent may be obtained for five cents each, by addressing the "Commissioner of Patents, Washington, D. C."